United States Patent [19]

Müller et al.

[11] Patent Number: 5,314,721
[45] Date of Patent: May 24, 1994

[54] PROCESS FOR SIZING PAPER

[75] Inventors: Michael Müller, Bergisch Gladbach; Joachim Probst, Leverkusen; Heinrich Alberts; Joachim König, both of Odenthal; Heinz Bäumgen, Leverkusen; Fritz Puchner, Cologne, all of Fed. Rep. of Germany

[73] Assignee: Bayer Aktiengesellschaft, Leverkusen, Fed. Rep. of Germany

[21] Appl. No.: 751

[22] Filed: Jan. 5, 1993

[30] Foreign Application Priority Data

Jan. 14, 1992 [DE] Fed. Rep. of Germany ....... 4200715

[51] Int. Cl.$^5$ .............................. B05D 3/02
[52] U.S. Cl. .................... 427/386; 162/135; 162/164.3; 162/164.6; 162/168.1; 427/391
[58] Field of Search ............. 524/714, 720, 457, 514; 427/386, 391; 162/135, 168.1, 164.6, 164.3

[56] References Cited

U.S. PATENT DOCUMENTS

| | | | |
|---|---|---|---|
| 3,046,186 | 7/1962 | Arlt | 162/167 |
| 3,323,979 | 6/1967 | Foster et al. | 162/167 |
| 3,642,572 | 2/1972 | Endres et al. | 525/430 |
| 4,087,395 | 5/1978 | Aldrich et al. | 524/607 |
| 4,250,299 | 2/1981 | Lehmann et al. | 528/342 |
| 4,256,636 | 3/1981 | Roos et al. | 534/830 |
| 4,319,018 | 3/1982 | Lehmann et al. | 528/232 |
| 4,405,408 | 9/1983 | Yoshioka et al. | 162/158 |
| 4,434,269 | 2/1984 | Probst et al. | 524/538 |
| 4,579,889 | 4/1986 | Kaffen et al. | 523/414 |
| 4,659,431 | 4/1987 | Probst et al. | 162/168.2 |
| 4,771,100 | 9/1988 | Das et al. | 524/714 |
| 4,806,591 | 2/1989 | Probst et al. | 524/820 |
| 4,835,206 | 5/1989 | Farrar et al. | 524/457 |
| 5,126,392 | 6/1992 | Nakashima et al. | 524/714 X |

FOREIGN PATENT DOCUMENTS

| | | |
|---|---|---|
| 0002474 | 6/1979 | European Pat. Off. . |
| 0058313 | 8/1982 | European Pat. Off. . |
| 0054075 | 8/1984 | European Pat. Off. . |
| 0197411 | 10/1986 | European Pat. Off. . |
| 0262945 | 4/1988 | European Pat. Off. . |
| 1802435 | 5/1970 | Fed. Rep. of Germany . |
| 2841045 | 4/1980 | Fed. Rep. of Germany . |
| 3401573 | 7/1985 | Fed. Rep. of Germany . |
| 3537824 | 4/1987 | Fed. Rep. of Germany . |

Primary Examiner—Judy M. Reddick
Attorney, Agent, or Firm—Sprung Horn Kramer & Woods

[57] ABSTRACT

The new vinyl polymer dispersions are obtainable by free radical polymerisation of olefinically unsaturated monomers in the presence of a cationic polyamidoamine which has been rendered hydrophobic, and can be used as sizing agents for paper which are distinguished, in particular, by their shear, electrolyte, heat and storage stability.

13 Claims, No Drawings

PROCESS FOR SIZING PAPER

The present invention relates to new vinyl polymer dispersions which are based on olefinically unsaturated monomers and polycations which have been rendered hydrophobic, a process for the preparation of these dispersions and their use as sizing agents for paper.

The preparation of cationic sizing agents for paper which are in the form of colloidally disperse solutions, in which acrylonitrile or methacrylonitrile is polymerised with acrylic acid esters or methacrylic acid esters in the presence of specific polymeric cationic emulsifiers in an aqueous system, is known from EP 0 058 313. The specific emulsifiers are quaternisation products of terpolymers of N,N-dimethylaminoethyl (meth)acrylate, styrene and acrylonitrile.

The preparation of colloidally disperse sizing agents for paper, which are particularly effective for low-grade paper, in which either mixtures of (meth)acrylonitrile, styrene and acrylic acid ester or methacrylic acid ester or mixtures of styrene and acrylic acid ester or methacrylic acid ester are polymerised in the presence of the abovementioned quaternised terpolymers, is described in DE-A-3 401 573.

One disadvantage of these colloidally disperse sizing agents is their often unsatisfactory stability in practice in the presence of electrolytes and at elevated temperatures, for example above 600° C., when high shearing forces are used, and their tendency to foam. Relatively large amounts of electrolytes occur in the papermaking process, for example if enzymatically degraded starch is added as an additive to the sizing liquor. In particular, after degradation of the starch, the enzyme activity is stopped by addition of acids, such as sulphuric or hydrochloric acid; the electrolytes are then formed by addition of bases during neutralisation of the excess acid. Since enzymatic degradation of starch is often also carried out at relatively high temperatures of about 80°–1000° C. and the starch solution is usually added to the sizing liquor immediately, an increase in the temperature of the sizing liquor to a maximum of these temperatures is in general to be expected. Under these conditions, the colloidally disperse sizing agents described above coagulate partly or even completely. Deposits are formed on the paper machine, and the sizing effect is reduced drastically. High shearing forces, which may also occur during papermaking, can lead to similar effects.

Cationic sizing agents for paper which have an improved stability and a reduced tendency to foam and are built up from the same monomers as in EP 0 058 313 and DE-A-3 401 573, but where the quaternisation of the emulsifier used which is based on N,N-dimethylaminoethyl (meth)acrylate, styrene and acrylonitrile is carried out not with epichlorohydrin but with simple monoepoxides, that is to say those which do not contain halogen, are described in DE-A-3 537 824. In this procedure, as in the examples mentioned above, the specific cationic emulsifiers are prepared in organic solvents, which have to be replaced before or after use of the cationic emulsifiers in the subsequent polymerisation. This procedure has disadvantages from the economic and ecological aspect.

Too great a tendency to foam, which can also lead to disturbances in the paper-processing process, is a further disadvantage of all the sizing agents described above.

The sizing agents known from the prior art usually are not equally suitable for beater and surface sizing of paper, or are not sufficiently inexpensive for use in the beater sizing.

Dimeric alkyl-ketenes are known reactive sizing agents for paper. For the necessary distribution of the alkyl-ketene dimer in aqueous solution, the use of cationic dispersing agents, such as polyamidopolyamine/epichlorohydrin resins (U.S. Pat. No. 3,046,186) or "one-pot reaction products" of various carboxylic acids with polyalkylene-polyamines and epichlorohydrin is described (EP 054 075). However, the resulting mixtures have only a limited storage stability. U.S. Pat. No. 4,087,395 describes epichlorohydrin resins of polyamidopolyamines, which are reacted with carboxylic acid derivatives having an unsubstituted acyl radical. These compounds have shown a clear sizing action on paper only in mixtures of low storage stability with ketene dimers.

It has now been found that shear-, electrolyte-, heat- and storage-stable sizing agents for beater and surface sizing of paper are obtained in an economically and ecologically advantageous process if certain olefinically unsaturated monomers are polymerised in the presence of cationic polyamidoamines which have been rendered hydrophobic.

The present invention relates to a process for the preparation of vinyl polymer dispersions by emulsion polymerisation, initiated by free radicals, of olefinically unsaturated monomers in an aqueous medium, characterised in that the emulsifier employed is a cationic polyamidoamine which as been rendered hydrophobic, has a content of cationic groups of between 0.01 and 0.3 charge equivalent per 100 g of this substance, a content of hydrophobic groups of between 0.5 and 50% by weight and a content of basic nitrogen atoms of between 0 and 3% by weight, in each case based on the cationic polyamidoamine which has been rendered hydrophobic, and is obtainable by rendering a basic polyamidoamine (A) hydrophobic with monocarboxylic acids (B), subsequent protonation with acids (C) and/or quaternisation with monoepoxides (D).

In the sense of this invention, a polyamidoamine "which has been rendered hydrophobic" is to be understood as a polyamidoamine which contains terminal long-chain aliphatic hydrocarbon radicals which have at least 7 C atoms and are derived from the corresponding monocarboxylic acids.

Suitable basic polyamidoamines (A) for the preparation of the cationic polyamidoamines which have been rendered hydrophobic are condensation products comprising structural units which are derived from a1): polyamines which contain at least two amino groups which are capable of amide formation and at least one other secondary or tertiary amino group and if appropriate a2): polyamines which contain two amino groups which are capable of amide formation, b): saturated or unsaturated aliphatic and/or aromatic dicarboxylic acids and/or functional derivatives thereof and if appropriate c): omega-aminocarboxylic acids and/or lactams, preferably 0.8 to 1.2 mol of component a1), if appropriate up to 0.8 mol of component a2), and if appropriate up to 1.5 mol of component c) being employed per mol of component b), with the proviso that the molar ratio of a):b) assumes values of between 0.8:1 and 1.2:1.

The polyamines al) preferably correspond to the formula

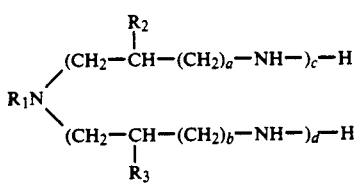

wherein
R$_1$, R$_2$ and R$_3$ independently of one another are H, methyl, ethyl or 2-hydroxyethyl,
a and b independently of one another represent 0, 1, 2, 3 or 4 and
c and d independently of one another represent 1, 2, 3, 4, 5 or 6,
and/or the formula

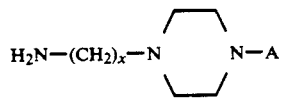

wherein
x represents 2 or 3 and
A represents hydrogen, aminoethyl or aminopropyl.

Examples of polyamines al) of the formula (I) are diethylenetriamine, triethylenetetramine, tetraethylenepentamine, pentaethylenehexamine, hexaethyleneheptamine, dipropylenetriamine, dihexamethylenetriamine, N-methyl-bis(3-aminopropyl)amine and tris(2-aminoethyl)amine.

Examples of polyamines al) of the formula (II) are N-(2-aminoethyl)piperazine, N,N'-bisaminoethylpiperazine and N,N'-bisaminopropylpiperazine.

Preferred polyamines al) are triethylenetetramine, diethylenetriamine and N-methyl-bis(3-aminopropyl)amine.

The polyamines a2) preferably correspond to the formula

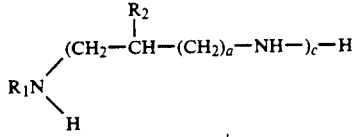

wherein
R$_1$, R$_2$, a and c have the abovementioned meaning, and/or the formula

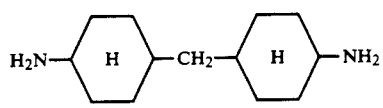

and/or the formula

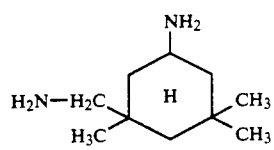

Examples of polyamines a2) are ethylenediamine, diaminopropane, 1,6-diaminohexane, N-(2-hydroxyethyl)ethylenedismine, N,N'-dimethylethylenediamine, N-methyl-1,3-diaminopropane, isophoronediamine and 4,41-diaminodicyclohexylmethane.

Preferred lactams c) are, for example, ε-caprolactam and lauryl-lactam, and preferred aminocarboxylic acids c) are 6-aminocaproic acid and 11-aminoundecanoic acid.

Dicarboxylic acids b) or alkyl esters thereof which are preferably employed are those which correspond to the formula $$R_4-O-CO-(CH_2)_e-CO-O-R_5 \quad (VI)$$

wherein
R$_4$ and R$_5$ independently of one another represent hydrogen, C$_1$-C$_6$-alkyl or phenyl, and e represents 0 or an integer from 1 to 10.

Mixtures of dicarboxylic acids b) or functional derivatives thereof can of course also be employed in the preparation of the polyamidoamines (A). The following dicarboxylic acids and dicarboxylic acid derivatives b) may be mentioned as examples:
oxalic acid, malonic acid, succinic acid, glutaric acid, adipic acid, sebacic acid, dimethyl oxalate, diethyl oxalate, diethyl malonate, succinic anhydride, glutaric acid monomethyl ester, diethyl glutarate, adipic acid monomethyl ester, dimethyl adipate, dimethyl sebacate, isophthalic acid, terephthalic acid, dimethyl isophthalate, maleic anhydride, itaconic acid, dimethyl itaconate and phthalic acid. Adipic acid is preferred.

Possible basic polyamidoamines (A) are also those in which up to 20 mol % of the secondary basic amino groups present are converted into tertiary amino groups by alkylation. Alkylation here is to be understood as meaning reaction of the secondary amino groups with alkyl halides, alkyl alkanesulphonates and acrylic compounds. The following alkyl halides may be mentioned as examples:
methyl chloride, ethyl chloride, chloropropanol, chloroethanol and chloropropanediol.

The following alkyl alkanesulphonates may be mentioned as examples:
methyl methanesulphonate, ethyl methanesulphonate and chloropropyl ethanesulphonate.

The polyamidoamines are prepared in the customary manner, for example by a procedure in which components al), if appropriate a2) and b), and if appropriate c) are first heated to temperatures of between 100 and 150° C., and, after a maximum of 3 hours, the resulting mobile melt is further heated slowly to a maximum of 220° C. under normal pressure, the water of reaction formed being distilled off. To avoid discolourations, it is advantageous to carry out the condensation with exclusion of oxygen, and if appropriate to add carboxylic acid hydrazides in small amounts. The mixture is distilled until the theoretical amount of water has been withdrawn from the equilibrium, that is to say 1 mol of water must be split off per mol of carboxyl group of the dicarboxylic acid.

Long-chain monocarboxylic acids (B) are preferably employed for rendering the basic polyamidoamines (A) hydrophobic.

Suitable monocarboxylic acids (B) are preferably, aliphatic monocarboxylic acids or aliphatic monohydroxycarboxylic acids having up to 32 carbon atoms.

The preferred monocarboxylic acids (B) correspond to the formulae $$R_6\text{—}COOH \quad \text{(VII)}$$

wherein
$R_6$ represents straight-chain or branched, saturated or olefinically unsaturated alkyl having 7 to 31 C atoms, and $$R_7\text{—}COOH \quad \text{(VIII)}$$

wherein
$R_7$ represents straight-chain or branched, saturated or olefinically unsaturated monohydroxyalkyl having 7 to 31 C atoms.

Particularly preferred monocarboxylic acids (B) are furthermore hydroxycarboxylic acid polycondensates of the formula $$H\text{—}[\text{—}O\text{—}R_6\text{—}CO\text{—}]_f\text{—}OH \quad \text{(IX)}$$

wherein
$R_6$ has the meaning given above under formula (VII) and
f represents an integer from 2 to 50, preferably from 3 to 20.

The monocarboxylic acids (B) mentioned of the formulae (VII), (VIII) and (IX) can be employed individually, but also as any desired mixture with one another.

The hydroxycarboxylic acid polycondensates (IX) are particularly preferably reacted in the form of their functional derivatives of the formulae $$R_6\text{—}CO\text{—}[\text{—}O\text{—}R_6\text{—}CO\text{—}]_f\text{—}OH \quad \text{(X)}$$

$$H\text{—}[O\text{—}R_6\text{—}CO\text{—}]_f\text{—}Cl \quad \text{(XI)}$$

and $$R_6\text{—}CO\text{—}]\text{—}O\text{—}R_6\text{—}CO\text{—}]_f\text{—}Cl \quad \text{(XII)}$$

wherein
$R_6$ and f in each case have the abovementioned meaning,
with the basic polyamidoamines.

The derivatisation of the polycondensates (IX) is carried out, for example, by acylation of the free alcohol function to give an ester (X) and/or activation of the free acid function to give an acid chloride (XI) or (XII).

The polycondensates (IX) are formed in a known manner (compare, for example, Houben-Weyl, Methoden der Organischen Chemie (Methods of Organic Chemistry), volume XIV/2, G. Thieme Verlag) by heating the hydroxycarboxylic acids (VIII) if appropriate with addition of acids or tetraalkyl titanates, and, for example, azeotropic removal of the water formed.

The functional derivatives of the formula (X) can be obtained from the polycondensates (IX) by acylation of the free alcohol function with a monocarboxylic acid (VII) or acid chlorides or anhydrides thereof.

The compounds of the formulae (XI) and (XII) can be obtained by reaction of the polycondensates (IX) or of the acylated derivatives of the formula (X) with inorganic acid chlorides, such as, for example, phosphorus trichloride, phosphorus pentachloride or thionyl chloride.

The functional derivatives of the formula (X) can be employed as the monocarboxylic acids (B) individually or in any desired mixtures with one another, with the hydroxycarboxylic acid polycondensates (IX) or with the carboxylic acids (VII) and (VIII).

The acid chlorides of the formulae (XI) and (XII) can be employed individually or as a mixture, but advantageously not as a mixture with the other monocarboxylic acids mentioned under (B).

Suitable hydroxycarboxylic acids (VIII) are, for example, 2-hydroxydodecanoic, 2-hydroxytetradecanoic and 2-hydroxyhexadecanoic acid. Particularly preferred acids are, for example, 12-hydroxyoctadecanoic acid and 11-hydroxyhexadecanoic and -pentadecanoic acid.

Corresponding unsaturated hydroxycarboxylic acids, such as 12-hydroxy-9-octadecenoic acid, are also suitable compounds.

The suitable long-chain carboxylic acids (VII) include, for example, decanoic, dodecanoic, tetradecanoic, hexadecanoic, octadecanoic, eicosanoic and docosanoic acid, and the unsaturated acids oleic acid, linoleic acid, linolenic acid and docosenoic acid.

In particular, mixtures of various hydroxycarboxylic acids and mixtures of various long-chain carboxylic acids can also be employed.

To render the basic polyamidoalmines (A) hydrophobic, these are initially introduced into the reaction vessel in molten form at temperatures of between 120 and 250° C., and the long-chain carboxylic acid (VII), the hydroxycarboxylic acid (VIII), the hydroxycarboxylic acid polycondensate (IX) or acylated or activated derivatives thereof (X), (XI) or (XII), or the mixtures mentioned of these compounds, are added. The mixture is stirred at an unchanged temperature for between 2 and 10 hours, until the reaction has ended, volatile reaction products being removed.

Subsequent protonation and/or quaternisation of the basic polyamidoamines which have been rendered hydrophobic leads to cationic polyamidoamines which have been rendered hydrophobic. Acids (C) which are suitable for the protonation are, for example, inorganic acids, such as hydrochloric acid, sulphuric acid, nitric acid or phosphoric acid. Preferred acids (C) are dilute or concentrated organic carboxylic acids having a short alkyl chain which contains 1 to 4 C atoms, such as formic acid, acetic acid, propionic acid or lactic acid. Acetic acid is particularly preferred. The amount of acid (C) is in general chosen so that all the amino functions of the basic polyamidoamine which has been rendered hydrophobic are protonated completely. However, it is also possible to employ less than or more than the stoichiometric amount of acid (C).

If acid chlorides of the formulae (XI) or (XII) are used for rendering the polyamidoamines (A) hydrophobic, partial protonation already occurs during the reaction due to the hydrogen chloride liberated, which is largely trapped by free amine functions of the polyamidoamine.

Monoepoxides (D) which are suitable for the quaternisation are ethylene oxide, 1,2-butylene oxide, 2,3-butylene oxide, isobutylene oxide, 1,2-epoxydecane, 1,2-epoxydodecane, styrene oxide, cyclohexene oxide or glycidyl alcohol. Propylene oxide is preferred. A particularly preferred monoepoxide is epichlorohydrin. The monoepoxides (D) are in general employed in amounts of 1 to 80, preferably 1 to 40, and particularly preferably 5 to 20 mol %, based on the content of basic amine functions in the basic polyamidoamine which has been rendered hydrophobic.

However, the basic polyamidoamines which have been rendered hydrophobic can also obtain their cationic charge by first being partly quaternised in the manner mentioned, and then additionally being protonated by addition of acid.

The cationic polyamidoamines which have been rendered hydrophobic and are employed as emulsifiers in the process according to the invention are preferably obtained by condensation of polyamines a1) of the formula

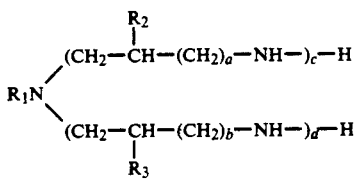
(I)

wherein
$R_1$, $R_2$ and $R_3$ independently of one another are H, methyl, ethyl or 2-hydroxyethyl,
a and b independently of one another represent 0, 1, 2, 3 or 4 and
c and d independently of one another represent 1, 2, 3, 4, 5 or 6,
and/or the formula

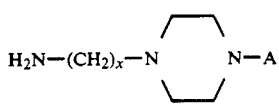
(II)

wherein
x represents 2 or 3 and
A represents hydrogen, aminoethyl or aminopropyl, and if appropriate polyamines a2) of the formula

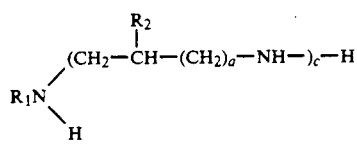
(III)

wherein
$R_1$, $R_2$, a and c have the abovementioned meaning, with 80 to 120 mol % of dicarboxylic acids or derivatives thereof b) of the formula

(VI)

wherein
$R_4$ and $R_5$ independently of one another represent hydrogen, $C_1$-$C_6$-alkyl or phenyl and
e represents 0 or an integer from 1 to 10,
based on the total molar amount of polyamines employed, subsequent rendering of the resulting basic polyamidoamines (A) hydrophobic with 10 to 100 mol % of a longchain monocarboxylic acid (B) of the formula $$R_6\text{—}COOH \quad \text{(VII)}$$

wherein
$R_6$ represents straight-chain or branched, saturated or olefinically unsaturated alkyl having 7 to 31 C atoms, and/or the formula $R_7$ represents straight-chain or branched, saturated or olefinically unsaturated monohydroxyalkyl having 7 to 31 C atoms,
and/or the formula

(IX)

and/or the formula

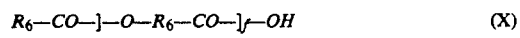
(X)

or with 10 to 100 mol % of an acid chloride of the formula

(XI)

and/or the formula

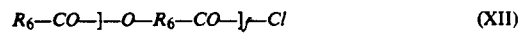
(XII)

wherein, in each case,
$R_6$ and f have the abovementioned meanings,
and the mol % data for the formulae (VII) to (XII) in each case relate to the content of primary and secondary amine functions in the basic polyamidoamine (A), subsequent protonation of the resulting polyamidoamine, which has been rendered hydrophobic, with 50 to 100 mol % of dissociated protons of an acid (C), and/or quaternisation with 1 to 80 mol % of a monoepoxide (D), in each case based on the content of basic amine functions in the polyamidoamine (A) which has been rendered hydrophobic.

In the process according to the invention, olefinically unsaturated monomers are subjected to free radical polymerisation in the presence of the emulsifiers described above in more detail.

Suitable monomers which can be polymerised by free radicals are, in particular, styrene (derivatives), esters of (meth) acrylic acid, in particular having $C_1$-$C_{12}$-alkyl radicals which are optionally further substituted, and/or (meth)acrylonitrile, as well as mixtures of these monomers. Examples which may be mentioned are: styrene, α-methylstyrene, p-methylstyrene, p-ethylstyrene, p-chlorostyrene, acrylonitrile, vinyl acetate, ethyl acrylate, methyl methacrylate, n-butyl acrylate, i-butyl acrylate, 2-ethylhexyl acrylate and oxypropyl methacrylate.

Either the monomers by themselves or mixtures thereof with one another can be used for preparation of the vinyl polymer dispersions according to the invention. A monomer mixture of
d) 5 to 95, preferably 20 to 80% by weight of acrylonitrile, methacrylonitrile or styrene, or mixtures thereof,
and
e) 5 to 95, preferably 20 to 80% by weight of (meth)-acrylic acid ester having 1 to 12 C atoms in the alcohol radical
—the sum of components d) and e) always being 100% by weight— is especially preferably used for preparation of the vinyl polymer dispersions according to the invention.

(Meth)acrylic derivatives in the context of this invention are derivatives of methacrylic acid or of acrylic acid.

Suitable (meth)acrylic acid esters which are employed as comonomers in the free radical copolymerisation are preferably those compounds which form, with (meth) acrylonitrile or styrene or mixtures thereof, copolymers having film-forming temperatures below 100° C. Acrylates, such as methyl, ethyl, n-butyl and 2-ethylhexyl acrylate, and methacrylates, such as methyl and n-butyl methacrylate, are suitable in principle. n-Butyl acrylate is particularly suitable. These (meth)acrylates can in each case be copolymerised by themselves or as a mixture of various (meth)acrylates with methacrylonitrile, acrylonitrile or styrene, or with mixtures of two or three of the monomers mentioned last. Acrylonitrile is the preferred copolymerisation partner. The content of styrene, acrylonitrile or methacrylonitrile or of mixtures of these components can be between 5 and 95, preferably 20 and 80, and particularly preferably between 40 and 60% by weight.

To prepare the vinyl polymer dispersions according to the invention, a monomer mixture of d) and e) is preferably emulsified in water in the presence of 2 to 70% by weight, based on the monomer mixture, of a cationic polyamidoamine which has been rendered hydrophobic, and the resulting emulsion is subjected, at temperatures of 20 to 150° C., to emulsion polymerisation initiated by free radicals.

In addition to the cationic polyamidoamine which has been rendered hydrophobic, a further cationic and/or nonionic auxiliary emulsifier can be employed in amounts of 1 to 40% by weight, preferably 3 to 20% by weight, based on the above cationic polyamidoamine which has been rendered hydrophobic, for preparation of the vinyl polymer dispersions according to the invention. The nonionic emulsifier preferably corresponds to the formula

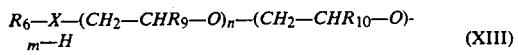

$$R_6-X-(CH_2-CHR_9-O)_n-(CH_2-CHR_{10}-O)_m-H \qquad (XIII)$$

wherein x represents oxygen, NH or COO, $R_6$ represents a higher aliphatic, cycloaliphatic, araliphatic or aromatic hydrocarbon radical having 4 to 30 C atoms, $R_9$ and $R_{10}$ independently of one another represent alkyl radicals having 1 to 12 C atoms or hydrogen and n and m independently of one another represent an integer between 2 and 100.

The cationic auxiliary emulsifier preferably corresponds to the formula

$$\begin{matrix} R_{11} & R_{12} \\ & \diagdown \diagup \\ & N^+ \quad Y^- \\ & \diagup \diagdown \\ R_{13} & R_{14} \end{matrix} \qquad (XIV)$$

wherein $R_{11}$ and $R_{12}$ independently of one another represent a higher aliphatic or araliphatic hydrocarbon radical having 6 to 20 C atoms, $R_{13}$ and $R_{14}$ independently of one another represent a lower aliphatic hydrocarbon radical having 1 to 6 C atoms and $Y^-$ represents a halide ion.

Suitable nonionic auxiliary emulsifiers (XIII) are reaction products of aliphatic, araliphatic, cycloaliphatic or aromatic carboxylic acids, alcohols, phenol derivatives or amines with epoxides, such as, for example, ethylene oxide. Examples of these are reaction products of ethylene oxide with carboxylic acids, such as, for example, lauric acid, stearic acid, oleic acid, the carboxylic acids of castor oil or abietic acid, with longer-chain alcohols, such as oleyl alcohol, lauryl alcohol or stearyl alcohol, with phenol derivatives, such as, for example, substituted benzyl- or phenylphenols and nonylphenol, and with longer-chain amines, such as, for example, dodecylamine and stearylamine. The reaction products with ethylene oxide are oligo- or polyethers having degrees of polymerisation of between 2 and 100, preferably of 5 to 50.

Suitable cationic low molecular weight auxiliary emulsifiers are quaternary ammonium salts, such as, for example, benzyldodecyl-dimethyl-ammonium chloride.

Possible initiators for the emulsion polymerisation are, preferably, water-soluble nonionic peroxides which supply free radicals, such as hydrogen peroxide and tert-butyl hydroperoxide, as well as water-soluble azo compounds according to DE-A-2 841 045. Redox systems which comprise peroxidic initiators and reducing agents, such as amines, polyamines, thiourea, iron(II) salts and the like, are also suitable. Possible initiators are also water-insoluble initiators, such as azoisobutyronitrile and benzoyl peroxide. The latter are then dissolved practically only in the organic phase.

The initiators mentioned are added in amounts of 0.1 to 5% by weight, preferably 0.3 to 3% by weight, based on the monomer mixture.

Customary regulators, such as, for example, n-dodecylmercaptan, tert-dodecylmercaptan, diisopropylxanthogen disulphide, thioglycol and glycerol, can be employed for regulation of the molecular weights. They are added in amounts of 0.1 to 2% by weight, based on the monomer mixture.

The emulsion polymerisation in an aqueous medium can be carried out by known polymerisation processes, either discontinuously or continuously, or in the feed process. The continuous process and the feed process are particularly preferred. In the latter, water, together with some or all of the emulsifier system and if appropriate some of the monomer mixture, are initially introduced into the reaction vessel under a nitrogen atmosphere and are heated up to the polymerisation temperature of 20 to 150° C., preferably 50 to 100° C., and the monomer mixture as well as the initiator and if appropriate emulsifier are added dropwise in the course of 0.5 to 10 hours, preferably 1 to 6 hours.

After some time, the mixture is in general after-activated, and the reaction is brought to completion up to a conversion of about 98.0 to 99.9%. After the emulsion copolymerisation, residue monomers are removed by distillation in vacuo. Water is then added in an amount such that an approximately 10 to 35% strength by weight aqueous colloidally disperse solution results. The viscosity of these dispersions, measured in a rotary viscometer at 200° C., is in general below 50 mpas. The average particle diameters, measured by means of laser scattered light spectroscopy, are between 15 and 300 nm, preferably between 50 and 150 nm, depending on the reaction conditions.

The stability of the colloidally disperse vinyl polymers according to the invention is also increased by grafted contents of the polymer on the polymeric emulsifier employed in the form of the cationic polyamidoamine which has been rendered hydrophobic. The polymer of components d) and e) and the cationic polyamidoamine which has been rendered hydrophobic are thus to a large degree inseparable components, since they are chemically bonded, after the polymerisation.

The vinyl polymer dispersions according to the invention can be employed as sizing agents for paper and card by all the working methods customary for surface and beater sizing in papermaking. The cationic polyamidoamines which have been rendered hydrophobic and are employed for is preparation of the vinyl polymers can be prepared without addition of solvents and therefore without pollution of the environment and inexpensively.

The vinyl polymer dispersions according to the invention are preferably employed in amounts of 0.01 to 10% by weight of the solid contained in the vinyl polymer dispersions, based on the weight of air-dried paper to be produced.

When used as surface sizing agents, the vinyl polymers according to the invention can also be employed on paper which has been subjected to beater presizing. In addition to the vinyl polymer dispersions according to the invention themselves, it is of course also possible to use commercially available cationic beater sizing agents for this presizing.

Furthermore, it may be advantageous to add to the vinyl polymer dispersions according to the invention commercially available cationic retention agents as sizing intensifiers for paper sizing. These cationic polymers are known per se and are derived, in particular, from polyamidoamines (EP 2 474, DE-A-1 802 435), diallyldimethylammonium chlorides (EP 262 945) or modified polyacrylamides (US 3 323 979). In general, 0.02 to 1% by weight, preferably 0.1 to 0.5% by weight, of a retention agent is added.

PREPARATION EXAMPLES

1. Precursors

Example 1.1 Polyamidoamine P 1

2,178 g of bis(3-aminopropyl)methylamine and 2,103 g of adipic acid were introduced into the reaction vessel together at 1500° C., while passing nitrogen over, and were heated slowly to 1900° C., the water of reaction being distilled off. After 8 hours, the mixture was cooled. The resulting brittle, brownish solid had a residual content of primary amino groups of 0.26% ("van Slyke" determination at room temperature).

Example 1.2 Polyamidoamine P 2

1,450 g of bis(3-aminopropyl)methylamine and 1,314 g of adipic acid were subjected to condensation at temperatures between 150 and 210° C. for 10 hours, using a water separator, as described for polyamidoamine P 1. The residual content of primary amine in the resulting product was 0.36%.

Example 1.3 Hydroxycarboxylic Acid Polycondensate H 1

2,019 g of 12-hydroxystearic acid, 224 g of stearic acid, 108 g of palmitic acid, 8 g of myristic acid and 3 g of p-toluenesulphonic acid were introduced into 1 l of m-xylene, and the mixture was boiled, using a water separator, until the resulting clear, brownish oil had a residual acid number of 57.8.

Example 1.4 Hydroxycarboxylic Acid Polycondensate H 2

4,382 g of 12-hydroxystearic acid, 35 g of stearic acid and 5.9 g of p-toluenesulphonic acid were introduced into 2 l of m-xylene, and the mixture was boiled, using a water separator, until the resulting clear, brownish oil had a residual acid number of 23.8 and an OH number of 13.

Example 1.5 Hydroxycarboxylic Acid Polycondensate H 3

1,873 g of 12-hydroxystearic acid, 290 g of stearic acid, 35 g of palmitic acid, 3 g of myristic acid and 1.5 g of tetrabutyl orthotitanate were introduced into 550 g of xylene, and the mixture was heated for 24 hours, using a water separator. A clear, brownish oil having an acid number of 43 was formed.

Example 1.6 Acylated Hydroxycarboxylic Acid Polycondensate AcH2

161 g of stearic acid, 77 g of palmitic acid and 6 g of myristic acid were added to 3,700 g of hydroxycarboxylic acid polycondensate H 2, and the mixture was heated first at 140° C. for 6 hours and then at 170° C. for 2 hours. Excesses of the carboxylic acids employed could be filtered via a filter of 50 mm pore width, after cooling. The resulting oily product had a residual OH number of 4.5 and an acid number of 23.4.

Example 1.7 Activated Hydroxycarboxylic Acid Polycondensate ActH1

250 g of thionyl chloride were briskly added dropwise to 1,000 g of hydroxycarboxylic acid polycondensate H 1 at room temperature, while passing nitrogen over, and the mixture was then subsequently stirred at 90° C. for 6 hours. After volatile constituents had been stripped off at 80° C. under 0.1 mbar, a dark brown oil was obtained, in which, according to quantitative IR analysis, all the acid groups had been reacted to give acid chloride functions.

IR (film): $\nu$2920, 2850, 1808, 1733, 1465, 1380, 1255, 180, 1115, 970, 733 cm$^{-1}$.

Example 1.8 Activated Hydroxycarboxylic Acid Polycondensate ActH2

1,000 g of acylated hydroxycarboxylic acid polycondensate AcH2 were reacted with 250 g of thionyl chloride as described for ActH1. In the resulting dark brown oil, according to IR analysis, all the acid groups had been converted into acid chloride functions.

IR (film): $\nu$2920, 2860, 1810, 1740, 1650, 1550, 1485, 382, 1260, 1180, 1120, 735 cm$^{-1}$

2. Preparation of the Polymeric Emulsifier

Example 2.1 Polyamidoamine Rendered Hydrophobic HP 1

185 g of activated hydroxycarboxylic acid polycondensate ActH1 were added dropwise to 1,356 g of polyamidoamine P 1 at 165° C. in the course of 0.5 hour, while passing nitrogen over and stirring. The mixture was subsequently stirred for 5 hours, and a beige solid was obtained which, according to IR analysis, was free from acid chloride functions.

IR (film): $\nu$=3270, 3060, 2940, 2873, 2800, 2320, 1740, 640, 1550, 1463, 1380, 1250, 1200, 1160, 1060 cm$^{-1}$

Example 2.2 Polyamidoamine Rendered Hydrophobic HP 2

1,449 g of polyamidoamine P 1 were reacted with 325 g of activated hydroxycarboxylic acid polycondensate ActH2 as described for HP 2. According to IR analysis, the resulting beige solid was free from acid chloride functions.

IR (film): $\nu$3270, 3050, 2930, 2800, 2320, 1640, 1550, 1460, 1380, 1275, 1150, 1090, 1058 cm$^{-1}$

Example 2.3 Polyamidoamine Rendered Hydrophobic HP 3

2,178 g of bis(3-aminopropyl)methylamine and 2,103 g of adipic acid were heated for 8 hours, using a water separator, starting at 150° C. and with the temperature rising to 200° C. The content of primary amine after this time was 0.3% (measured by the "van Slyke" method at room temperature). A mixture of 135 g of stearic acid, 65 g of palmitic acid and 5 g of myristic acid was then added briskly, and the condensation was continued at 200° C. for 2.5 hours, using a water separator. After cooling, a dark brown solid was obtained.

IR (film): $\nu$3250, 2920, 1650, 1552, 1450, 1380, 1260, 1155, 1040 cm$^{-1}$

Example 2.4 Polyamidoamine Rendered Hydrophobic HP 4

1,938 g of N-2-aminoethylpiperazine and 2,103 g of adipic acid were heated for 8 hours, using a water separator, first at 180° C. and, as the reaction progressed, at 200° C. A mixture of 258 g of docosenoic acid, 14 g of eicosenoic acid and 5 g of octadecenoic acid was then added, and the mixture was heated for a further 8 hours, using a water separator. After cooling, a yellowish solid was obtained.

IR (film): $\nu$3300, 2920, 1620, 1550, 1440, 1240, 1155, 1030, 1008 cm$^{-1}$

Example 2.5 Cationic Polyamidoamine Rendered Hydrophobic CHP 1

200 g of product HP 1 were stirred into a mixture of 1,760 g of water and 40 g of glacial acetic acid, so that no residue remained on filtration over a 50 $\mu$m filter. The resulting solution was then stirred at 9500 revolutions/minute for 5 minutes.

Example 2.6 Cationic Polyamidoamine Rendered Hydrophobic CHP 2

A solution was prepared from 200 g of product HP 2, 1,760 g of water and 40 g of glacial acetic acid as described for CHP 1.

Example 2.7 Cationic Polyamidoamine Rendered Hydrophobic CHP 3

200 g of product HP 3 were dissolved in a mixture of 1,800 g of water and 45 g of glacial acetic acid at room temperature.

Example 2.8 Cationic Polyamidoamine Rendered Hydrophobic CHP 4

444 g of polyamidoamine P 2 and 261 g of hydroxycarboxylic acid polycondensate H 3 were introduced into the reaction vessel together, and were heated, using a water separator, first at 150° C. for 2 hours and then at temperatures rising to 200° C. for 4 hours. After cooling to 90° C., 1,600 g of water and 125 g of glacial acetic acid were added to the resulting condensate and the mixture was filtered over a 200 mm filter (solids content 28.7%).

Example 2.9 Cationic Polyamidoamine Rendered Hydrophobic CHP 5

200 g of product HP 4 were dissolved in a mixture of 2,300 g of water and 488 g of glacial acetic acid at room temperature.

3. Preparation of the Emulsion Polymers

Example 3.1 Emulsion Polymer E 1

| Solution 1: | 1,030 g of cationic polyamidoamine rendered hydrophobic CHP 1<br>1,030 g of water |
|---|---|
| Solution 2: | 291.5 g of acrylonitrile<br>291.5 g of n-butyl acrylate |
| Solution 3: | 1.6 g of 30% strength by weight aqueous hydrogen peroxide |
| Solution 4: | 16.3 g of 30% strength by weight aqueous hydrogen peroxide<br>686 g of water |
| Solution 5: | 3.9 g of 30% strength by weight aqueous hydrogen peroxide<br>39 g of water |

Solution 3 and 2.00 ml of solution 2 were briskly added to solution 1 at 70° C., while stirring, in an apparatus which was flushed thoroughly with nitrogen. After 0.5 hour, solution 4 and the remainder of solution 2 were metered in synchronously over 2 hours, and the mixture was subsequently stirred for 3 hours. After brisk addition of solution 5, the mixture was subsequently stirred for a further 3 hours. The batch was then degassed by distilling off 400 ml of liquid under 150 mbar, and was cooled and filtered over a 100 #m filter. 400 ml of water were added to the filtrate.

The resulting colloidally disperse solution had a solids content of 15.4% by weight and an average particle diameter of 165 nm.

Example 3.2 Emulsion Polymer E 2

| Solution 1: | 950 g of cationic polyamidoamine rendered hydrophobic CHP 2<br>950 g of water |
|---|---|
| Solution 2: | 269.0 g of acrylonitrile<br>269.0 g of n-butyl acrylate |
| Solution 3: | 1.5 g of 30% strength by weight aqueous hydrogen peroxide |
| Solution 4: | 15.0 g of 30% strength by weight aqueous hydrogen peroxide<br>63.3 g of water |
| Solution 5: | 3.6 g of 30% strength by weight aqueous hydrogen peroxide<br>36 g of water |

The emulsion polymerisation was carried out as described for polymer E 1.

The resulting colloidally disperse solution had a solids content of 14.9% by weight and an average particle diameter of 171 nm.

Example 3.3 Emulsion Polymer E 3

| Solution 1: | 745 g of cationic polyamidoamine rendered hydrophobic CHP 3<br>1,195 g of water |
|---|---|
| Solution 2: | 274.0 g of acrylonitrile<br>274.0 g of n-butyl acrylate |
| Solution 3: | 1.5 g of 30% strength by weight aqueous hydrogen peroxide |
| Solution 4: | 15.2 g of 30% strength by weight aqueous hydrogen peroxide<br>63.5 g of water |
| Solution 5: | 3.7 g of 30% strength by weight aqueous hydrogen peroxide<br>36.7 g of water |

The emulsion polymerisation was carried out as described for polymer E 1.

The resulting colloidally disperse solution had a solids content of 18.1% by weight and an average particle diameter of 107 nm.

Example 3.4 Emulsion Polymer E 4

| Solution 1: | 523 g of cationic polyamidoamine rendered hydrophobic CHP 4<br>2,450 g of water |
|---|---|
| Solution 2: | 425.0 g of acrylonitrile<br>425.0 g of n-butyl acrylate |
| Solution 3: | 2.0 g of 35% strength by weight aqueous hydrogen peroxide |
| Solution 4: | 20.0 g of 35% strength by weight aqueous hydrogen peroxide<br>1,000 g of water |
| Solution 5: | 5.0 g of 30% strength by weight aqueous hydrogen peroxide<br>50.0 g of water |

The emulsion polymerisation was essentially carried out as described for polymer E 1. Finally, 500 ml of liquid were distilled off, for degassing of volatile constituents, and were not replaced by water.

The resulting colloidally disperse solution had a solids content of 20.5% by weight and an average particle diameter of 160 nm.

Example 3.5 Emulsion Polymer E 5

| Solution 1: | 960 g of cationic polyamidoamine rendered hydrophobic CHP 5<br>1,040 g of water |
|---|---|
| Solution 2: | 288.0 g of acrylonitrile<br>288.0 g of n-butyl acrylate |
| Solution 3: | 1.7 g of 30% strength by weight aqueous hydrogen peroxide |
| Solution 4: | 16.0 g of 30% strength by weight aqueous hydrogen peroxide<br>65.0 g of water |
| Solution 5: | 3.9 g of 30% strength by weight aqueous hydrogen peroxide<br>36.4 g of water |

The emulsion polymerisation was carried out as described for polymer E 1.

The resulting colloidally disperse solution had a solids content of 20.2% by weight and an average particle diameter of 120 nm.

4. Comparison Example

A sizing agent according to Example 12 DE-A-3 537 824, the cationic emulsifier on which it is based having been prepared in isopropanol, which was distilled off after the emulsion polymerisation had taken place, is used as the comparison in the use examples.

5. Use Examples

The following use examples show the good usability of the novel vinyl polymer dispersions as sizing agents in papermaking.

The good usability as sizing agents is described for papers of various compositions, under various sizing conditions and according to various evaluation methods:

Paper types

| Alum-free paper: | 50% by weight of bleached softwood pulp,<br>50% by weight of bleached hardwood pulp, |
|---|---|
| | 9.5% of clay ash,<br>degree of beating 35° C. SR,<br>pH: 7.0 to 7.5,<br>weight per unit area: about 80 g/m$^2$ |
| Chalk-containing paper: | 50% by weight of bleached softwood pulp,<br>40% by weight of bleached hardwood pulp,<br>7.9% of chalk ash,<br>degree of beating 35° C. SR,<br>pH: 7.2 to 7.5,<br>weight per unit area: about 80 g/m$^2$ |

Sizing conditions

| Beater sizing: | The stated amount of vinyl polymer dispersion is added to a 0.5% strength by weight aqueous pulp mixture of 50 parts of bleached softwood pulp, 50 parts of bleached hardwood pulp, 20 parts of chalk and 0.2 part of retention agent Retaminol ® H, while stirring. After a short action time (10 to 20 seconds), a sheet of paper is formed on a laboratory sheet former. This is pressed off between felts and then dried at 100° C. in a drying cylinder. |
|---|---|
| Surface sizing: | Sizing of the above papers was carried out on a laboratory sizing press from Mathis, Zurich/Switzerland model HF. A solution of 5% strength by weight of commercially available potato starch (Perfectamyl ® A 4692) and the stated amount (see table) of the vinyl polymer dispersion to be tested in water was used as the sizing liquor. These papers are dried in a drying cylinder at 100° C. |

Evaluation method

| Cobb test: | According to DIN 53132, the absorption of water on one side of the paper over a test period of 60 seconds is used to evaluate the sizing action. |
|---|---|
| Ink flotation test (IFT): | Test papers having dimensions of 7 × 3 cm are placed on blue test ink (DIN 53126) at 22° C. After test periods, which vary for the individual types of paper, the samples of paper are removed from the ink, the reverse is pressed off on blotting paper and, after drying, the penetration of the ink to the surface is evaluated visually as a measure of the sizing action. No penetration is rated with 1, complete penetration with 5. The intermediate values lie proportionally in between. |

The tendency to foam, which is critical for many sizing agents during use, was moreover evaluated as follows.

0.4% by weight of the active substance of the vinyl polymer dispersion is introduced into a sizing liquor of 5% strength by weight of commercially available potato starch (Perfectamyl ® A 4692), and the mixture is heated to 60° C. 200 ml of this sizing liquor are poured out of an aluminium vessel, which has a circular opening of 4 mm diameter (Ford cup) on its underside, from a height of 60 cm, falling freely into a graduated flask beaker. The volume (in ml) of foam which forms above the surface of the liquid is determined on the one hand immediately, and after standing in air for one minute.

The first value provides information on the tendency of the sizing agent to foam, and the second value on the speed of breakdown of the foam or the stability thereof.

TABLE 1

Tendency of sizing agents to foam

| Sizing agent | Foam volume in ml immediate | after time t |
|---|---|---|
| E1 | 60 | 0 (t = 30 seconds) |
| E2 | 40 | 0 (t = 23 seconds) |
| E3 | 80 | 0 (t = 45 seconds) |
| E4 | 0 | 0 |
| E5 | 40 | 0 (t = 25 seconds) |
| Comparison | 90 | 50 (t = 60 seconds) |

TABLE 2

Surface sizing on alum-free paper

| Sizing agent | Cobb values in g/ml with addition of 0.8% by weight | 1.0% by weight | 2.0% by weight |
|---|---|---|---|
|  | of sizing agent (based on the pure active substance) | | |
| E1 | 50 | 33 | |
| E2 | 43 | 32 | |
| E5 | | | 21.9 |
| Comparison | 56 | 38 | 22.1 |

TABLE 3

Surface sizing on alum-free paper

| Sizing agent | 1st measurement pass IFT evaluation after a test time of 5 minutes and addition of 1% by weight of sizing agent (based on the pure active substance) |
|---|---|
| E1 | 2 |
| E2 | 2 |
| Comparison | 2 |
|  | 2nd measurement pass IFT evaluation after a test time of 1 minute and addition of 0.2% by weight of sizing agent (based on the pure active substance) |
| E2 | 1.5 |
| E3 | 1.5 |
| Comparison | 1.5 |
|  | 3rd measurement pass IFT evaluation after a test time of 5 minutes and addition of 1% by weight of sizing agent (based on the pure active substance) |
| E | 1.5 |
| Comparison | 1 |
|  | 4th measurement pass IFT evaluation after a test time of 3 minutes and addition of 2% by weight of sizing agent (based on the pure active substance) |
| E5 | 1 |
| Comparison | 1 |

TABLE 4

Surface sizing on chalk-containing paper

| Sizing agent | 1st measurement pass IFT evaluation after a test time of 5 minutes and addition of 1% by weight of sizing agent (based on the pure active substance) |
|---|---|
| E1 | 1.5 |
| E2 | 1.5 |
| Comparison | 1.5 |
|  | 2nd measurement pass IFT evaluation after a test time of 10 minutes and addition of 1% by weight of sizing agent (based on the pure active substance) |
| E4 | 1.5 |
| Comparison | 1.5 |

TABLE 5

Beater sizing of chalk-containing paper

| Sizing agent | Cobb values in g/ml with addition of 0.6% by weight of sizing agent (based on the pure active substance) |
|---|---|
| E1 | 27 |
| E2 | 26 |
| E3 | 24 |
| E5 | 22 |
| Comparison | 21 |

TABLE 6

Beater sizing of chalk-containing paper

| Sizing agent | IFT evaluation after a test period of 25 minutes and addition of 0.6% by weight of sizing agent (based on the pure active substance) |
|---|---|
| E1 | 2 |
| E2 | 1.5 |
| E3 | 1.5 |
| E5 | 1.5 |
| Comparison | 1.5 |

The above results during use show that the vinyl polymer dispersions according to the invention have clearly improved foam properties with a comparably good sizing action in comparison with the sizing agent according to Example 12 of DE-A-3 537 824. Furthermore, the sizing agents according to the invention are prepared in melts or water, without using organic solvents, and are therefore distinguished by ecological advantages over the prior art.

What is claimed is:

1. A process for sizing paper which comprises contacting the paper with a vinyl polymer dispersion obtained by emulsion polymerization, initiated by free radicals, of olefinically unsaturated monomers in an aqueous medium, the olefinically unsaturated monomers comprising
   a) 5 to 95% by weight of acrylonitrile, methacrylonitrile, styrene or mixtures thereof and
   b) 5 to 95% by weight of a (meth)acrylic acid ester having 1 to 12 C atoms in the alcohol radical,
   the sum of components a) and b) totalling 100% by weight,
and the emulsifier in said emulsion polymerization comprising a cationic polyamidoamine which has been rendered hydrophobic, has a content of cationic groups of between 0.01 and 0.3 charge equivalent per 100 g, a content of hydrophobic groups of between 0.5 and 50% by weight and a content of basic nitrogen atoms of between 0 and 3% by weight, in each case based on the cationic polyamidoamine which has been rendered hydrophobic, the polyamidoamine having been obtained by reaction of a basic polyamidoamine (A) with a monocarboxylic acid (B) and at least one of subsequent protonation with an acid (C) and quaternization with a monoepoxide (D).

2. The process of claim 1, in which the cationic polyamidoamine which has been rendered hydrophobic is obtained by reaction of a basic polyamidoamine (A) with a monocarboxylic acid (B) and subsequent quaternization with a monoepoxide (D).

3. The process of claim 1, in which the cationic polyamidoamine which has been rendered hydrophobic is obtained by reaction of a basic polyamidoamine (A) with a monocarboxylic acid (B) and subsequent protonation with an acid (C).

4. The process according to claim 1, in which the basic polyamidoamine (A) employed is a condensation product comprising structural units which are derived from
   a1) a polyamine which contains at least two amino groups which are capable of amide formation and at least one other secondary or tertiary amino group,
   and
   b) at least one of a saturated aliphatic dicarboxylic acid, an unsaturated aliphatic dicarboxylic acid, an aromatic dicarboxylic acid and a functional derivative thereof.

5. The process according to claim 4, in which 0.8 to 1.2 mol of component a1) is employed per mol of component b).

6. The process according to claim 1, in which the basic polyamidoamine (A) is a condensation product comprising structural units which are derived from
   a1) a polyamine which contains at least two amino groups which are capable of amide formation and at least one other secondary or tertiary amino group,
   and
   b) at least one of an aliphatic dicarboxylic acid, an unsaturated aliphatic dicarboxylic acid, an aromatic dicarboxylic acid and a functional derivative thereof,
   and at least one of
   a2) a polyamine which contains two amino groups which are capable of amide formation
   and
   c) an omega-aminocarboxylic acid or a lactam.

7. The process of claim 6, in which the structural units are derived from 0.8 to 1.2 mol of component a1), up to 0.8 mol of component a2), and up to 1.5 mol of component c) per mol of component b), the molar ratio of a1)+a2):b) ranging between 0.8:1 to 1.2:1.

8. The process according to claim 1, in which the monocarboxylic acid (B) is selected from the group consisting of compounds of the formula $$R_6-COOH \tag{VII}$$

wherein
R$_6$ represents straight-chain or branched, saturated or olefinically unsaturated alkyl having 7 to 31 C atoms, compounds of the formula $$R_7-COOH \tag{VIII}$$

wherein

R$_7$ represents straight-chain or branched, saturated or olefinically unsaturated monohydroxyalkyl having 7 to 31 C atoms, compounds of the formula $$H-[-O-R_6-CO-]_f-OH \tag{IX}$$

wherein
f represents an integer from 2 to 50,
and compounds of the formula $$R_6-CO-[-O-R_6-CO-]_f-OH \tag{X}$$

9. The process according to claim 1, in which there is employed as the monocarboxylic acid B) at least one functional derivative which is selected from the group consisting of compounds of the formula $$H-[-O-R_6-CO-]_f-Cl \tag{XI}$$

and $$R_6-CO-[-O-R_6-CO-]_f-Cl \tag{XII}$$

wherein
R$_6$ represents straight-chain or branched, saturated or olefinically unsaturated alkyl having 7 to 31 C atoms,
and
f represents an integer from 2 to 50.

10. The process according to claim 1, in which the acid (C) employed is an inorganic acid or an organic carboxylic acid having a lower alkyl chain which contains 1 to 4 C atoms.

11. The process according to claim 1, in which the monoepoxide (D) employed is ethylene oxide, 1,2-butylene oxide, 2,3-butylene oxide, isobutylene oxide, 1,2-epoxydecane, 1,2-epoxydodecane, styrene oxide, cyclohexane oxide, glycidyl alcohol, propylene oxide or epichlorohydrin.

12. The process according to claim 1, in which the emulsifier employed is a cationic polyamidoamine which has been rendered hydrophobic and is obtained by condensation of at least one polyamine a1) of the formula

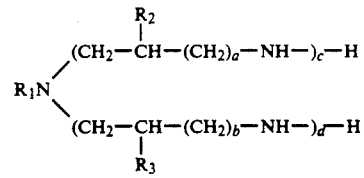

(I)

wherein
R$_1$, R$_2$ and R$_3$ independently of one another are H, methyl, ethyl or 2-hydroxyethyl,
a and b independently of one another represent 0, 1, 2, 3 or 4 and
c and d independently of one another represent 1, 2, 3, 4, 5 or 6,
or the formula

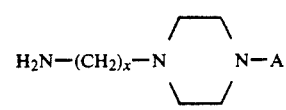

(II)

wherein x represents 2 or 3 and

A represents hydrogen, aminoethyl or aminopropyl, and optionally polyamines a2) of the formula

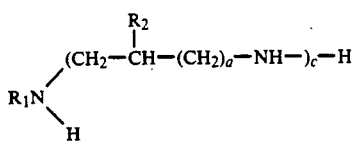 (III)

with 80 to 120 mol % of a dicarboxylic acid or derivative b) thereof of the formula

wherein $R_4$ and $R_5$ independently of one another represent hydrogen, $C_1$-$C_6$-alkyl or phenyl, and e represents 0 or an integer from 1 to 10, based on the total molar amount of polyamines employed, subsequent reaction of the resulting basic polyamidoamines (A) with 10 to 100 mol % of at least one long-chain monocarboxylic acid (B) of the formula

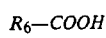 (VIII)

wherein $R_6$ represents straight-chain or branched, saturated or olefinically unsaturated alkyl having 7 to 31 C atoms, of the formula

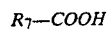 (VIII)

wherein $R_7$ represents straight-chain or branched, saturated or olefinically unsaturated monohydroxyalkyl having 7 to 31 C atoms, of the formula

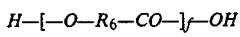 (IX)

or the formula

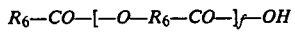 (X)

or with 10 to 100 mol % of at least one acid chloride of the formula

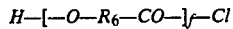 (XI)

or the formula

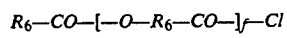 (XII)

wherein f represents an integer from 2 to 50, the mole % data for the formulae (VII) to (XII) in each case relating to the content of primary and secondary amine functions in the basic polyamidoamine (A), subsequent protonation of the resulting polyamidoamine, which has been rendered hydrophobic, with at least one of 50 to 100 mol % of dissociated protons of an acid (C) and quaternization with 1 to 80 mol % of a monoepoxide (D), in each case based on the content of basic amine functions in the polyamidoamine (A) which has been rendered hydrophobic.

13. The process according to claim 1, in which a monomer mixture of a) and b) is emulsified in water in the presence of 2 to 70% by weight of a cationic polyamidoamine which has been rendered hydrophobic, the percentages by weight being based on the monomer mixture employed, the resulting emulsion being subjected, at a temperature of 20 to 150° C., to an emulsion polymerization initiated by free radicals.

* * * * *